July 28, 1959    G. H. DAILEY    2,896,388
REVERSIBLE SIDE DELIVERY HAY RAKE
Filed April 4, 1957    3 Sheets-Sheet 1

Glenn H. Dailey
INVENTOR.

BY
Attorneys

July 28, 1959

G. H. DAILEY 2,896,388

REVERSIBLE SIDE DELIVERY HAY RAKE

Filed April 4, 1957

Glenn H. Dailey
INVENTOR.

BY
Attorneys

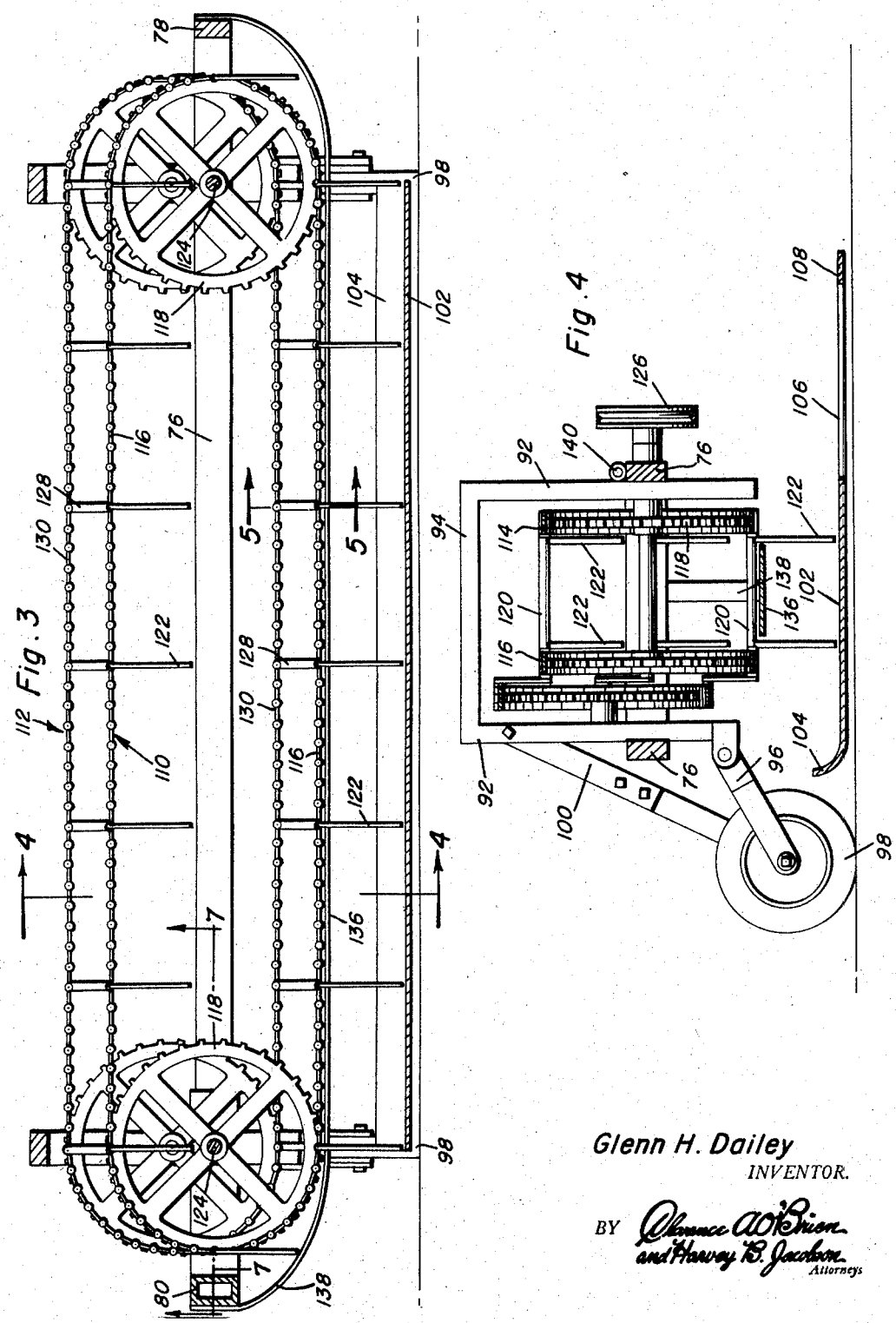

United States Patent Office 2,896,388
Patented July 28, 1959

2,896,388

REVERSIBLE SIDE DELIVERY HAY RAKE

Glenn H. Dailey, Bison, S. Dak.

Application April 4, 1957, Serial No. 650,772

2 Claims. (Cl. 56—23)

The present invention generally relates to a hay rake and more particularly to a reversible side delivery hay rake adapted to be attached to and operated in combination with a tractor attached mower which normally extends laterally from the tractor whereby the hay rake will receive the cut material immediately rearwardly of the cutter bar of the mower and discharge the same laterally of the cutter bar into a windrow for facilitating further handling of the hay either by way of a pick-up baler or a hay loader.

In certain geographical locations and especially in semi-arid areas, it is desirable to get the hay in the windrow as soon as possible inasmuch as the hay will promptly dry out and subsequent raking thereof by any means whatsoever will cause disengagement of the dried leaves and other particles from the stems of the hay thus destroying some of the value of the hay in that a portion thereof is lost during the raking operation. Therefore, the present invention incorporates a hay rake travelling immediately rearwardly of the cutter bar of a mower for receiving the material as soon as it has been cut and transporting the material laterally for positioning in a windrow.

An object of the present invention is to provide a hay rake in accordance with the preceding object in which the hay rake is operable in either lateral direction for forming a windrow at either end of the mower.

A further object of the present invention is to provide a hay rake in accordance with the preceding objects in which an endless conveyor chain having swingable hay engaging fingers is provided with the fingers being controlled by a control chain with a bottom plate and guide fingers being provided for moving the hay rearwardly from the cutter bar to the hay rake during forward movement of the cutter bar and hay rake.

Other objects of the present invention will reside in its simplicity of structural arrangement, adaptation for its particular purposes and its relatively inexpensive manufacturing and maintenance costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a longitudinal, vertical sectional view taken on an enlarged scale substantially upon a plane passing along section line 3—3 of Figure 2 illustrating the details of the endless chain conveyor means, the bottom plate and the stripper bar;

Figure 4 is a transverse, vertical sectional view taken substantially upon a plane passing along section line 4—4 of Figure 3 showing further structural details of the conveyor chain and the control chain for the hay pick-up fingers;

Figure 1:
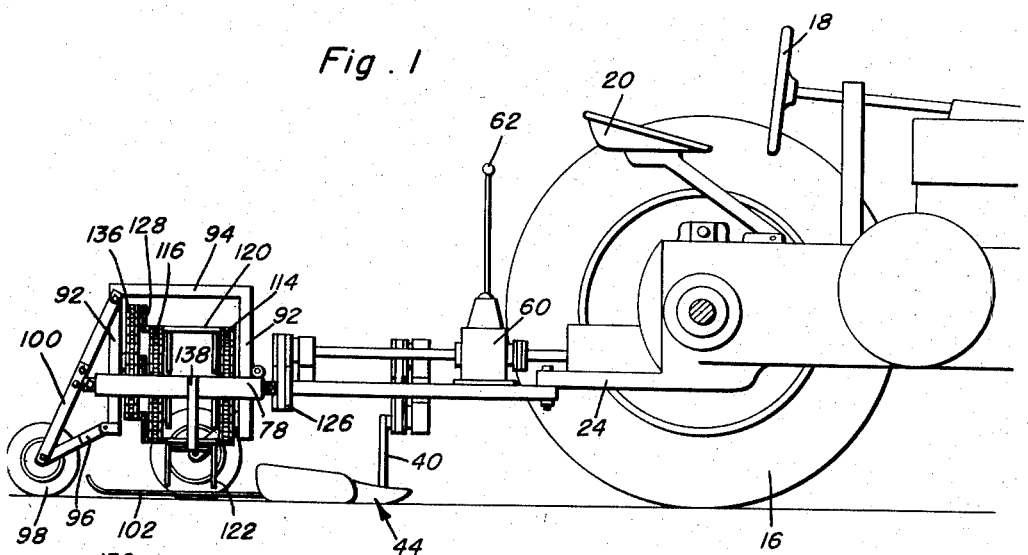
Figure 1 is a side elevational view of the side delivery hay rake of the present invention attached to a tractor with portions of the tractor being broken away and showing the relationship of the hay rake to the cutter bar of a mower.
Figure 5:
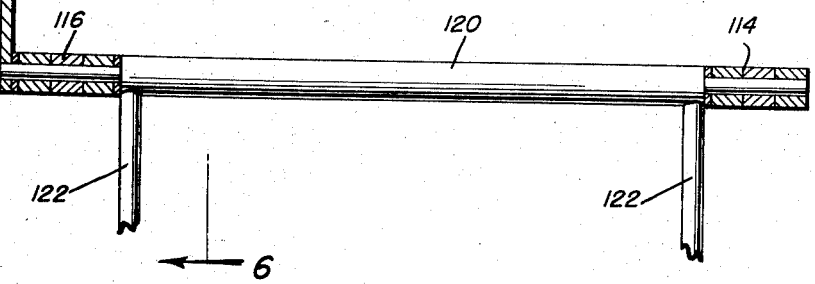
Figure 5 is a detailed sectional view taken substantially upon a plane passing along section line 5—5 of Figure 3 on an enlarged scale with parts shown in elevation for clarity and showing the details of the offset arm on the hay pick-up fingers for controlling the position of the pick-up fingers.
Figure 6:
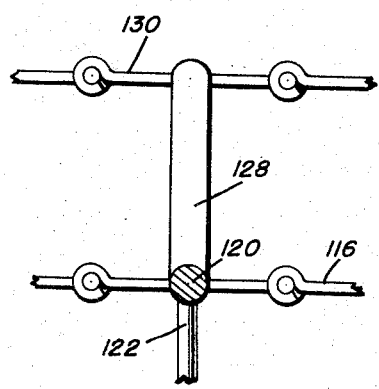
Figures 2, 7:
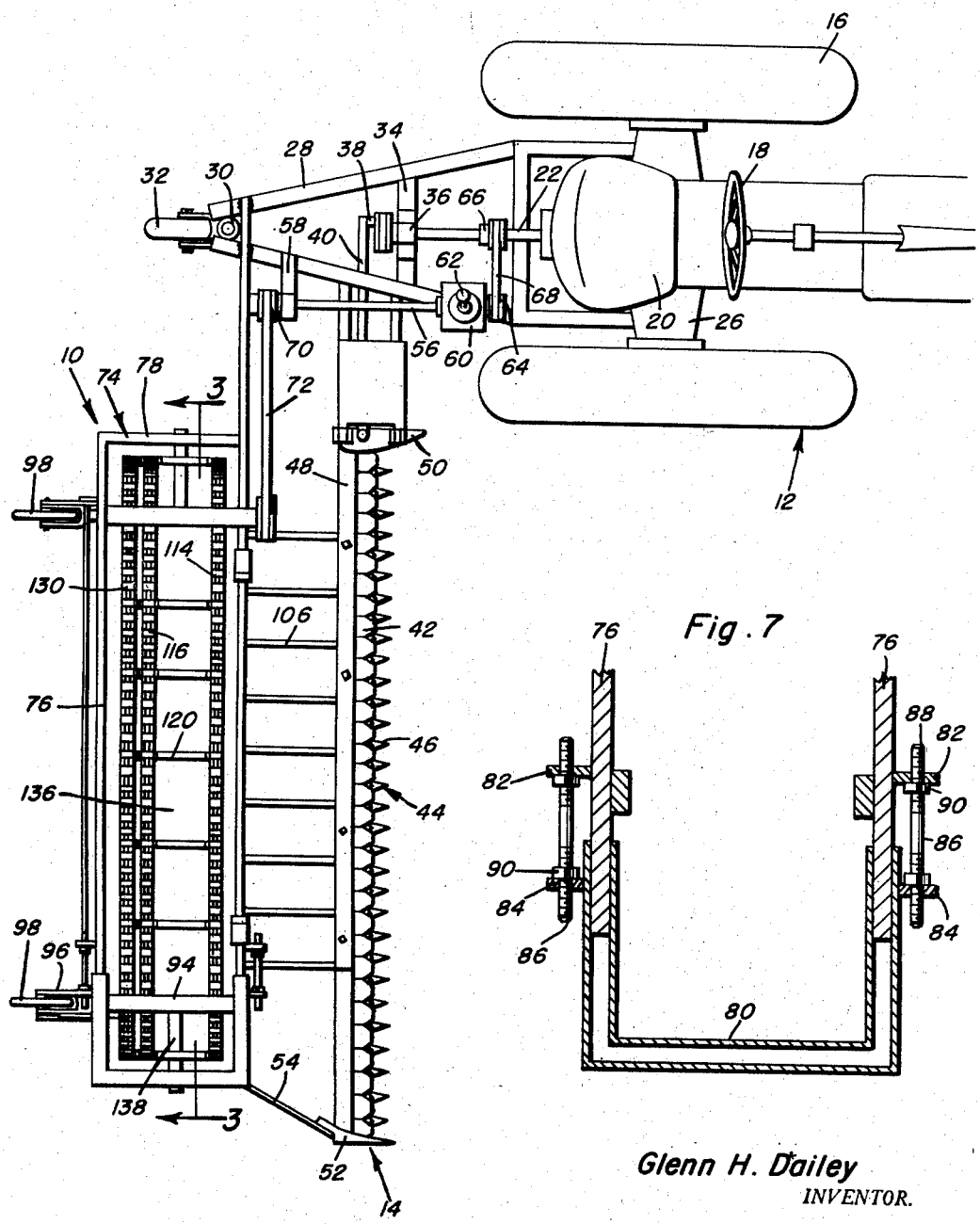
Figure 2 is a top plan view of the construction of Figure 1.

Figure 6 is a detailed sectional view taken substantially upon a plane passing along section line 6—6 of Figure 5 illustrating the orientation of the conveyor chain and control chain and the offset arm for controlling the position of the hay pick-up pin; and Figure 7 is a detailed sectional view taken substantially upon a plane passing along section line 7—7 of Figure 3 and illustrating the adjustable feature of the frame for controlling the tension of the conveyor chain and control chain and with the remainder of the structure omitted for clarity.

Referring now specifically to the drawings, the numeral 10 generally designates the reversible side delivery hay rake of the present invention for attachment to a farm tractor generally designated by the numeral 12 and disposed immediately rearwardly of the cutter bar of a mower generally designated by numeral 14.

The tractor 12 may be of any conventional construction and generally includes the usual rear driving wheels 16, a steering wheel 18 associated in adjacent relation to an operator's seat 20. The tractor 12 includes various control mechanisms not illustrated and also includes a power take-off shaft 22 as well as a rearwardly extending drawbar construction 24 associated with the rear axle housing 26, all of which represents conventional structural arrangements and forms no specific part of the present invention except for its association with the mower and hay rake.

Connected to and rearwardly extending from the drawbar 24 is a pair of converging arms 28 having a socket 30 at the outer or rear ends thereof for receiving a support wheel 32. The arms 28 include a cross arm 34 having a bearing 36 thereon for journaling the outer end of the power take-off shaft 22. An eccentric pitman construction 38 is provided on the outer end of the power take-off shaft 22 which has a pitman rod 40 connected thereto and connected with the cycle blade 42 of the cutter bar generally designated by numeral 44 which also includes the usual guards 46 and plate 48 with an inner runner shoe 50 and an outer runner shoe 52 to which is attached the usual swathe board 54 all of which represents conventional structural arrangement.

A lay shaft 56 is supported from a bracket 58 on one of the arms 28 with the inner end thereof being associated with a reverse gear mechanism 60 having a shift lever 62 for reversing the rotational direction of the shaft 56. The input of the reverse gear mechanism 60 is provided with a pulley 64 in alignment with a pulley 66 on the power take-off 22 and an endless belt 68 encircles the pulleys 64 and 66 for purposes of driving the lay shaft 56. The inner end of the lay shaft 56 is provided with a pulley 70 having a belt 72 encircling the same for a purpose described hereinafter.

The hay rake includes a horizontally disposed frame generally designated by numeral 74 and including elongated parallel front and rear members 76 with the inner ends thereof being interconnected by an end member 78 and the outer ends thereof being interconnected by a U-shaped hollow member 80 which may be of box frame construction with the ends of the U-shaped hollow member 80 telescopically receiving the ends of the front and rear horizontal members 76. On the outer surface of each of the members 76 is a projecting lug 82 and each leg of the U-shaped member 80 is provided with a projecting lug 84 in opposition and in alignment with the lug 82 with a threaded expansion member 86 extending therethrough with the member 86 having threads 88 on each end thereof with a nut 90 being disposed on each set of threads and engaging the inner surfaces of the lugs 82 and 84 whereby the U-shaped member 80 may be moved inwardly and outwardly in relation to the front and rear members 76 thus effectively varying the length thereof for a purpose described hereinafter.

Adjacent each end of the frame is provided front and rear vertical members 92 interconnected at their upper ends by a longitudinal member 94. The lower end of the rear vertical member 92 is provided with a rearwardly extending yoke 96 having a wheel 98 journaled therein with an upwardly extending longitudinally adjustable brace 100 being connected to the upper end of the vertical member 92 wherein the brace 100 may be adjusted for varying the position of the wheel 98 thus varying the height of the horizontally disposed frame 74.

An elongated bottom plate member 102 is disposed beneath the frame 74 and includes a rear edge which is upturned as designated by numeral 104 with a plurality of forwardly projecting fingers 106 extending from the forward edge thereof with the forward ends thereof being interconnected as designated by numeral 108 and connected to the cutter bar 44 so that the material being cut by the cutter bar will fall onto the guide fingers 106 and be moved rearwardly onto the upper surface of the bottom plate or base 102 during forward movement of the hay rake.

Disposed within the frame 74 is endless chain conveyor means including conveyor chains generally designated by numeral 110 and a control conveyor chain generally designated by numeral 112. The conveyor chain 110 includes a pair of endless chains 114 and 116 encircled over a pair of sprocket gears 118 adjacent each end of the frame 74. At spaced intervals along the chains 114 and 116 a transverse rod 120 is provided with the rod extending completely through the chains 114 and 116. Adjacent each end of the rod 120 immediately inwardly of the chains 114 and 116 is provided a pair of downwardly extending prongs or tines 122 for positioning adjacent the upper surface of the bottom plate 102 for engaging hay disposed thereon and moving the hay laterally of the frame 74. The sprocket gears 118 are mounted on transverse shafts 124 with the shaft 124 adjacent the line of movement of the tractor 12 extending through the vertical member 92 and being provided with a pulley 126 for receiving the drive belt 72 whereby the conveyor chains 114 and 116 may be driven.

As clearly shown in Figures 5 and 6, the end of the rod 120 adjacent the control chain assembly 112 is provided with a rigid offset arm 128. The control chain assembly includes an endless chain 130 which has a projecting connecting pin 132 at spaced intervals therealong connected to the upper end of the arm 128. Thrust washers 134 may be provided between each end of the arm 128 and the respective chains 116 and 132.

Extending below the frame and between the depending tines 122 is a stripper plate 136 having upwardly curved ends 138 whereby the stripper plate 136 prevents the hay from entering the area between the chains 114 and 116 and also acts to strip the hay from the tines 122 at the outer end of the movement of the tines as will be seen in Figure 3 by observing that the tines move upwardly and away from the stripper plate 136 as well as the curved ends 138.

The operation of the device will be readily apparent in that the hay or the material cut by the cutter bar 44 will immediately fall rearwardly and move rearwardly onto the bottom plate 102 whereby the laterally moving tines 122 will engage the hay and move the same laterally due to the driving forces exerted on the conveyor chains 110. The arms 128 which are rigid with the rods 120 will cause the tines to move from a position depending below the lower run of the chains 114 and 116 to a position depending below the upper run of the chains 114 and 116 due to the relationship between the conveyor chains 114 and 116 and the control chain 130 and the interconnecting link or arm 128.

A laterally extending tool bar or rod 140 is schematically illustrated as being rigid with arms 28 and connected with frame 74. By employing the shift lever 62 on the transmission, which may be conveniently an automobile transmission, the direction of movement of the hay may be controlled.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What I claim as new is as follows:

1. A side delivery hay rake for use in combination with a tractor having a laterally extending mower mounted thereon with the tractor having a power take-off, said rake comprising an elongated frame adapted to be supported rearwardly of and generally parallel to the mower, a laterally extending endless driven sprocket chain supported on said frame and disposed substantially parallel to the mower, a plurality of tines pivotally mounted on said chain, control means for said tines including an endless driven control chain mounted on said frame and movable in a path parallel to and spaced above the path of movement of the endless tine carrying chain, each of said tines including a rigid vertically depending arm pivotally connected to said control chain whereby the arm will be maintained in vertical position for maintaining the tines in vertical position throughout their path of movement, said frame being provided with an upwardly curved stripper plate mounted thereon, said plate being disposed adjacent the path of movement of the tines and having upwardly curved end portions disposed longitudinally outwardly of the frame and tine carrying sprocket chain whereby the tines will move upwardly past the edge of the stripper plate when moving from the lower run of the tine carrying sprocket chain to the upper run thereof.

2. The structure as defined in claim 1 wherein said elongated frame is adjustable in length for maintaining the tension of the chains, and drive means drivingly connected with the tine carrying chain with said drive means including a reversing mechanism for reversing the direction of movement of the tine carrying chain and reversing the direction of movement of the hay engaged thereby.

References Cited in the file of this patent

UNITED STATES PATENTS

| | | |
|---|---|---|
| 476,961 | McPherson | June 14, 1892 |
| 479,033 | Swift | July 19, 1892 |
| 1,932,717 | Wickersham | Oct. 31, 1933 |
| 2,484,981 | Coultas | Oct. 18, 1949 |
| 2,494,946 | Ingram | Jan. 17, 1950 |
| 2,605,599 | Curry | Aug. 5, 1952 |
| 2,660,022 | Hester | Nov. 24, 1953 |

FOREIGN PATENTS

| | | |
|---|---|---|
| 130,171 | Germany | Apr. 23, 1902 |
| 23,813 | Great Britain | Oct. 26, 1906 |
| 321,380 | Switzerland | June 15, 1957 |